United States Patent
Gururaj et al.

(10) Patent No.: US 11,496,558 B2
(45) Date of Patent: Nov. 8, 2022

(54) PEER-TO-PEER BLOCKCHAIN FABRIC MANAGEMENT MECHANISM

(71) Applicant: Hewlett Packard Enterprise Development LP, Houston, TX (US)

(72) Inventors: Prabhanjan Gururaj, Bangalore Karnataka (IN); Thomas Golway, Plandome, NY (US); Grandhi Gururaja, Bangalore Karnataka (IN); Sharath Gopinath, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/775,769

(22) Filed: Jan. 29, 2020

(65) Prior Publication Data
US 2021/0234921 A1 Jul. 29, 2021

(51) Int. Cl.
*H04L 67/104* (2022.01)
*H04L 9/06* (2006.01)
*H04L 69/329* (2022.01)
*H04L 67/1001* (2022.01)
*H04L 9/00* (2022.01)

(52) U.S. Cl.
CPC .......... *H04L 67/104* (2013.01); *H04L 9/0643* (2013.01); *H04L 67/1001* (2022.05); *H04L 69/329* (2013.01); *H04L 9/50* (2022.05)

(58) Field of Classification Search
None
See application file for complete search history.

(56) References Cited

U.S. PATENT DOCUMENTS

| 2019/0251199 | A1  | 8/2019  | Klianev |
|---|---|---|---|
| 2019/0354397 | A1* | 11/2019 | Goel ...................... G06Q 40/00 |
| 2020/0125738 | A1* | 4/2020  | Mahatwo ................ H04L 63/20 |
| 2020/0241981 | A1* | 7/2020  | Ding .................. G06F 11/2028 |
| 2021/0014046 | A1* | 1/2021  | Ivkushkin ............. H04L 9/3239 |
| 2021/0081430 | A1* | 3/2021  | Ivkushkin ............. H04L 9/3239 |

FOREIGN PATENT DOCUMENTS

| CN | 109688012 A    |   | 4/2019  |
|---|---|---|---|
| CN | 110572287 A    |   | 12/2019 |
| CN | 110609868 A    | * | 12/2019 |
| JP | 2019160312 A   |   | 9/2019  |

OTHER PUBLICATIONS

IBM, "IBM Blockchain Platform," Dec. 17, 2017, pp. 1-11, Retrieved from the Internet on Jan. 6, 2020 at URL: <cloud.ibm.com/docs/blockchain?topic=blockchain-ibp-console-ha&locale=se> INSOLAR, "Insolar," Dec. 6, 2019, pp. 1-61, Release 1.0.
Multichain, "Clustering Nodes for High Availability," 2020, pp. 1-4, Coin Sciences Ltd., Retrieved from the Internet on Jan. 6, 2020 at URL: <multichain.com/developers/clustering-high-availability/>.

* cited by examiner

*Primary Examiner* — Lance Leonard Barry
*Assistant Examiner* — Mohammad Yousuf A. Mian
(74) *Attorney, Agent, or Firm* — Trop, Primer & Hu, P.C.

(57) ABSTRACT

A system is described. The system includes a distributed ledger peer-to-peer blockchain fabric comprising a plurality of peer nodes, including a first peer node to receive a workload package, examine the workload package to determine a role of the first peer node within a cluster configuration of a first set of the plurality of peer nodes and execute the workload package at resources included in the first peer node.

11 Claims, 11 Drawing Sheets

PEER-TO-PEER BLOCKCHAIN FABRIC MANAGEMENT MECHANISM

BACKGROUND

Blockchain technology provides new ways of handling infrastructure as a service (IaaS). A blockchain is a time-stamped series of immutable records of data that is managed by a cluster of computers. Each of these blocks of data (e.g., blocks) is secured and bound using cryptographic principles (e.g., chain). A blockchain infrastructure involves many machines (or peer nodes) working together in a decentralized network of peers as a shared computer system infrastructure. A blockchain network has no central authority, and is a shared and immutable ledger in which information is open for anyone and everyone to see. New business models are emerging based the fundamental principles of block chain technology are currently being developed to provide enterprise blockchain product offerings.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
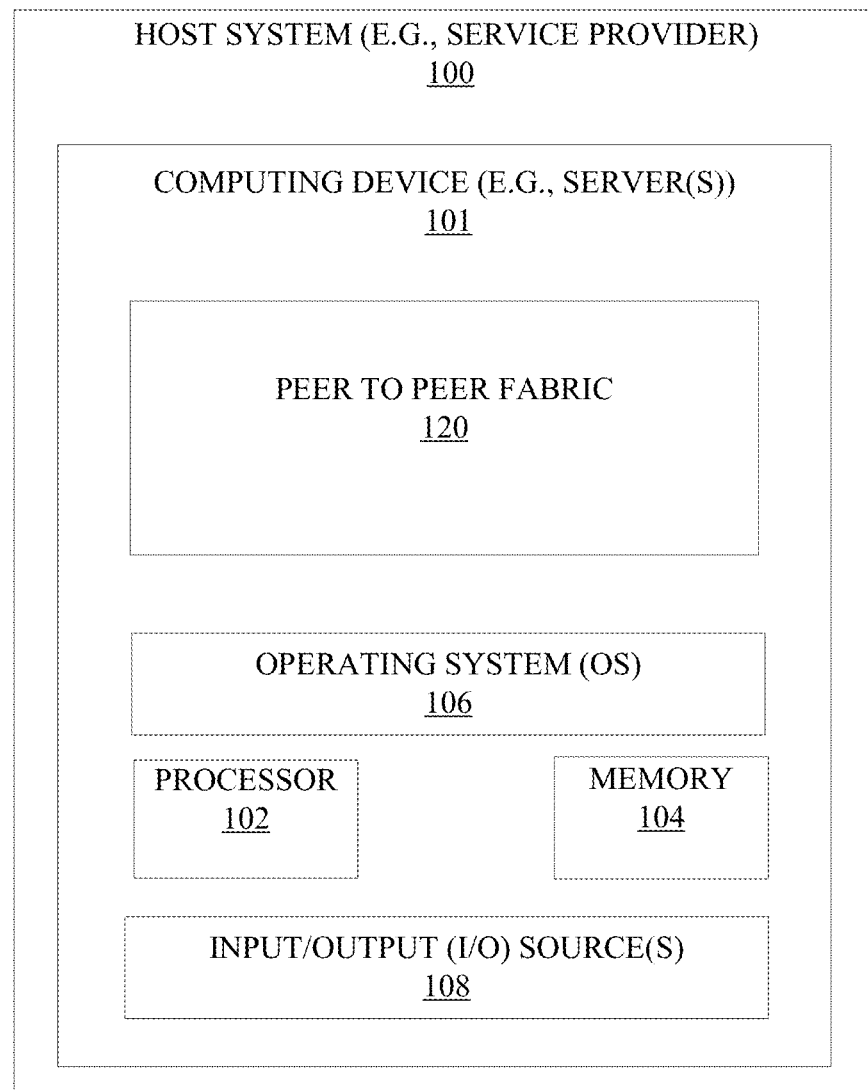
FIG. 1 illustrates one embodiment of a system employing a peer to peer fabric.

Distributed ledger peer-to-peer network systems (e.g., blockchain systems) distribute a ledger across several peer nodes (referred to herein as node or peer), where each node replicates and saves an identical copy of the ledger and updates itself independently. When a ledger update occurs, each node constructs a new transaction and a designated set of nodes subsequently vote using a consensus algorithm to determine which copy of the ledger is correct. Thus, the designated set of nodes authenticate and validate the correctness of a transaction. Once a consensus has been determined, all of the other nodes update themselves with the new, correct copy of the ledger. However if one or more of the participating nodes fail to approve a transaction, an update is not added to the ledger (or a block is not adjoined to a chain). While one or more peers disapproving the transaction for the lack of authenticity is welcomed, the unavailability of peer at the time of authentication will typically stall the transaction.

Thus embodiments are disclosed that provide a peer-to-peer fabric in which peers are integrated in a clustering configuration to execute a workload package (or package). As defined herein, a package comprises a unit of workload that includes a group of requested services and resources (e.g., storage, network, a set of governing rules, etc.) needed to execute the package. In such embodiments, the operation of a peer may vary based on a type of operation that is to be performed. For example, the peers may be implemented to perform different roles based on a type of distributed ledger fabric being implemented (e.g., a Hyperledger or Corda blockchain fabrics). Thus, the fabric peers may be configured in one of a plurality of package configurations.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a system 100. As shown in FIG. 1, data system 100 includes one or more computing devices 101 that may be server computers serving as a host for system 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 may serve as a service provider core in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

Figure 2:
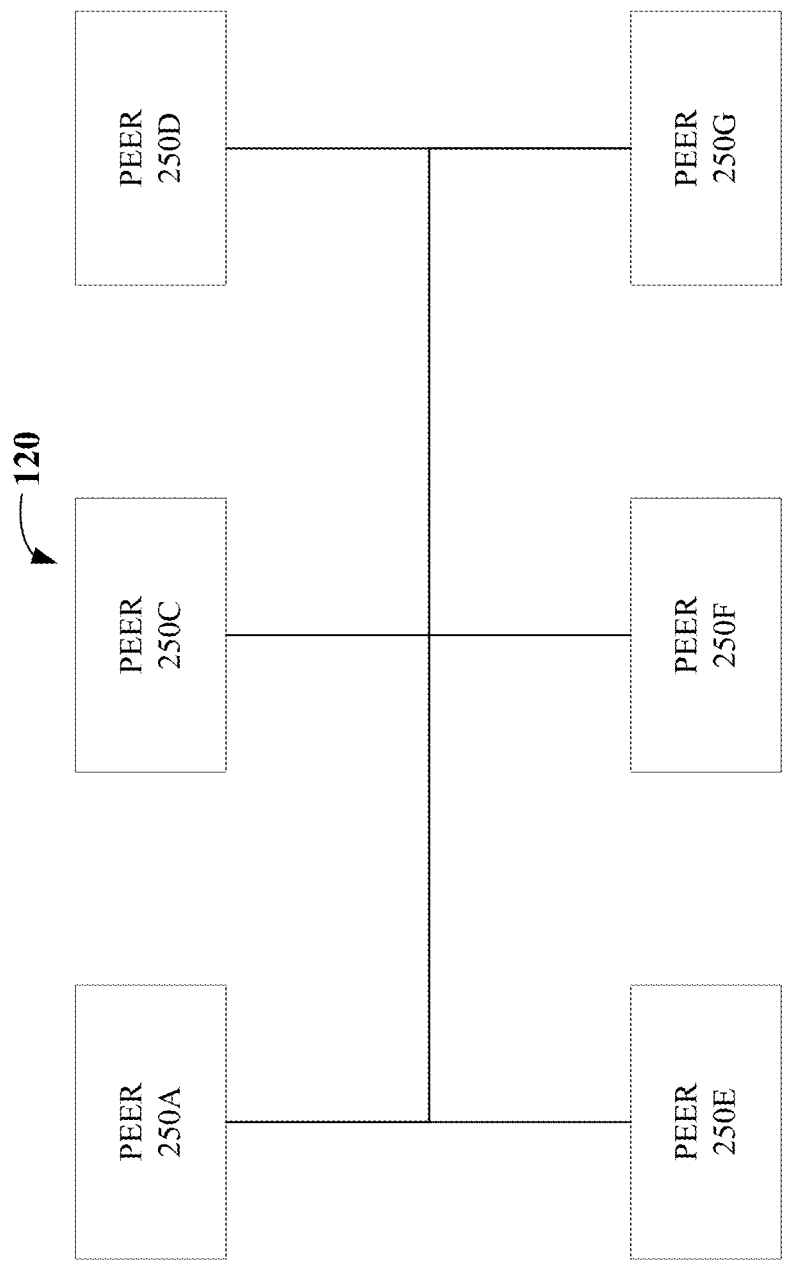
FIG. 2 is a block diagram illustrating one embodiment of a peer to peer fabric.

According to one embodiment, computing device 101 is implemented to host a distributed ledger peer-to-peer fabric 120. In such an embodiment, fabric 120 is configured to perform operations associated with different blockchain fabric configurations (e.g., a Hyperledger or Corda blockchain). In a further embodiment, the fabric 120 configuration is based on the clustering configuration of peers within fabric 120 according to execute workload packages. FIG. 2 illustrates one embodiment of fabric 120 having a plurality of peers (or nodes) 250 (e.g., 250A-250G).

In one embodiment, each peer 250 comprises one or more resources (e.g., compute, storage, software, etc.) that may be grouped with one or more other peers to operate as a cluster to execute a package. As defined herein, a cluster is a set of distinct peer resources that operate as a single system to provide resources, wherein the resources may be instantiated in a physical and/or virtualized environment. In one embodiment, the cluster of peers may be generated using an available clustering solution (e.g., Serviceguard® developed by HPE®). Thus, the resources of one or more peers 250 may be configured as one or more Point of Developments (PODs) (or instance machines), where an instance machine (or instance) comprises a cluster of infrastructure resources (e.g., compute, storage, software, networking equipment, etc.) that operate collectively.

According to one embodiment, a peer 250 may be configured to have a one peer, multi-peer or multi-role role to facilitate different fabric 120 configurations based on the type of package received. A one-peer package comprises package service components operating on a single peer. Thus, a failure of any packaged critical service component (e.g., service, network, application, etc.) will cause the package to be halted on the peer 250 that is providing the services. In response, another peer 250 is selected (e.g., from a configuration list associated with the package) to provide the services. For example, the package may be halted at peer 250A and moved to peer 250D based on a selection from the configuration list of peers included in a package configuration file.

According to one embodiment, a package configuration file incudes a package identifier, type of the package and the list of the peers 250 on which the package can operate. In a further embodiment, the package configuration file includes one or more modules that are implemented to monitor platform resources based on the role of peers 250 on which the package is configured to execute. In such an embodiment, modules provide a mechanism to a package manager to monitor and execute resources of the peer 250 platform. Table 1 shows one embodiment of a package configuration file.

TABLE 1

| Package Configuration | Details |
| --- | --- |
| Identifier | An identity (a unique ID) to identify a package |
| Type | One-peer |
|  | multi-peer |
|  | multi-role |
| Peers | List of peers for the given package |
| Modules | Name of modules to be included |

A multi-peer package simultaneously operates on two or more peers 250 in a cluster of distributed peers. Thus, failure of one or more packaged component at a peer 250 will cause the package to be halted only on the peer at which the failure occurred. However, the package will continue to operate actively on other configured peers 250 in the cluster. For example, a package operating on peers 250A, 250B and 250C will continue operating at peers 250B and 250C upon execution being halted at peer 250A. Thus, the difference between the one-peer and multi-peer packages is that a one-peer package recovers a failed instance of the package on a dedicated standby node (e.g., guarantees performance), while a multi-peer package recovers the failed instance on a peer 250 hosting another instance of the package (e.g., guarantees availability).

A multi-role package enables a peer 250 to be configured for a defined role. Thus, in case of non-availability of a particular peer 250, another peer 250 in a cluster takes on an additional role (e.g., the role of the non-available peer 250). Thus, a multi-role package is a combination of the one-peer and multi-peer packages. In one embodiment, a failed peer 250 reclaims its original role from the peer 250 taking on the addition role once the peer 250 has recovered. Accordingly, a multi-role package is a set of nodes that may: a) be configured to perform the role of certain services in a permissioned Blockchain; and b) take additional roles whenever one or more nodes in a package are unavailable goes down.

The multi-role implementation provides the capability for a peer 250 to take on dual roles. Thus, a peer 250 may be configured with both one-peer and multi-role packages in order to ensure both performance and availability. In one embodiment, a one-peer configuration receives a priority that enables an instance to first attempt to be recovered on a steady standby peer, if available. However, the multi-role peer configuration ensures that the instance is recovered on a configured peer if none of the standby peers are available.

Figure 3:
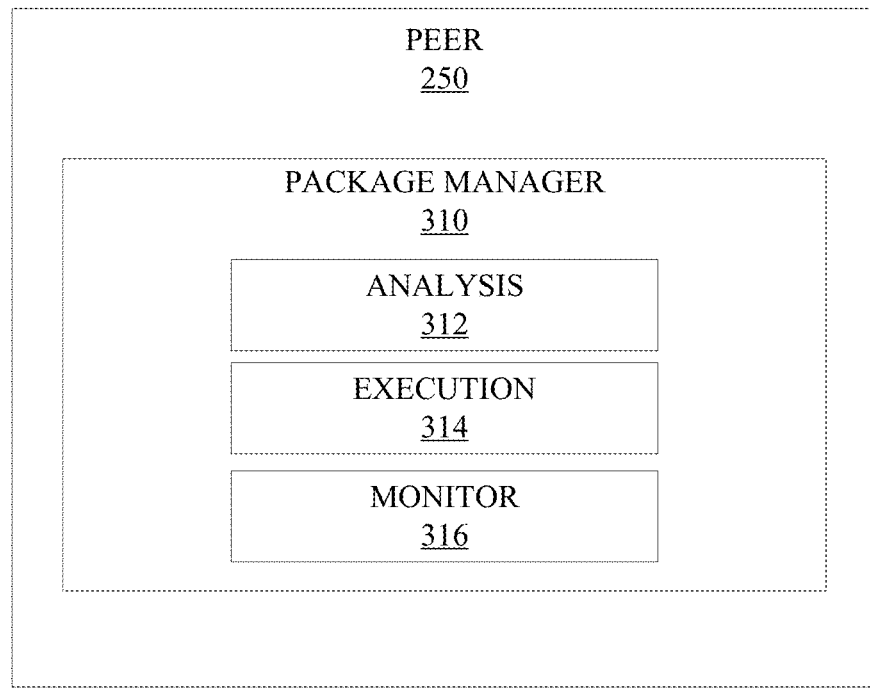
FIG. 3 illustrates one embodiment of a peer.

FIG. 3 illustrates one embodiment of a peer 250 including a package manager 310 to manage package configuration and operations at each peer 250 within a configured cluster. As shown in FIG. 3, package manager 310 includes an analysis engine 312 to receive and analyze a package configuration file to determine a package configuration. Additionally, package manager 310 includes an execution engine 314 to begin and halt execution of packages and their respective services once the package configuration has been determined. Execution engine 314 is also implemented to react to any changes in resource status. In such an embodiment, execution engine executes packages using modules included in the package configuration. Monitor 316 monitors the resources at peer 250. According to one embodiment, monitor 316 monitors resources according to one or more monitoring modules included in the package configuration. Table 2 shows one embodiment of modules that be included in a package.

TABLE 2

| Module | Details |
| --- | --- |
| anchor_module | For peers that play role of anchoring in Hyperledger like platforms for example. |
| endorser_module | Information of node acting as endorsers |
| chaincode_module | Chain code installation and instantiation status |
| channel_module | Captures the network details of the channel |
| database_module | This can hold the details of external databases and even ledger part of the node_module |
| ca_module | This captures the details of instance providing CA services |
| notifier_module | Holds details of distributed notifier services in Corda like platform |
| DR_module | Contains configuration details of the DR site |
| app_module | Any Application services that are dependent on the Block chain platform |

According to one embodiment, each of the modules represent a service resource (e.g., blockchain service) that is to be performed at a peer 250. In such an embodiment, a module determines information for various parameters that are to efficiently control the operations of corresponding resources (e.g., compute, storage, etc.). For example, database_module may determine the array details, database type and configurations. Furthermore, the database_module may determine details of remote ledgers in case of replicated databases implemented for disaster recovery. Similarly, the parameters in the channel_module will determine network ports, subnets, IP addresses that are to be monitored.

In one embodiment, the one-peer package is configured to operate on a cluster of peers 250 that executes only one instance (e.g., active—passive) (e.g., peer nodes in a Corda enterprise platform). Thus, failure of any of the modules will result in package manager 310 immediately shutting down the package on the failed node. Subsequently, the package is started up on another (e.g., standby) peer in the cluster. In a further embodiment, blockchain services that have many instances executing, such as notifier (notifier_module) and ordering, are packaged as multi-peer. In this embodiment, a leader of the distributed nodes is identified and the resources are managed until at least one of the active peers 250 is running. Upon a determination that a module has failed at a peer 250, only the instance of service on that peer 250 is halted by the multi-peer package. Thus, other instances continue to execute at other node. Whenever a multi-peer package on a failed node recovers, the multi-peer package will mark the node to again be included in the distributed cluster.

In a Corda platform, the availability of a node is mandatory, and unlike other permissioned Blockchain platforms, the consensus occurs only between interested parties. Thus, unavailability of any one node will affect continuity. In a Hyperledger Fabric platform, an orderer may be configured as multi-peer package to ensure continuous functioning of services. Accordingly, multiple instances of a load balancing service and the ordering service will execute on all configured nodes. Failure of an instance on any one node will impact other instances. The multi-peer includes the node to the cluster as soon as the node is recovered, resulting in the instance being re-triggered.

Figure 4A:
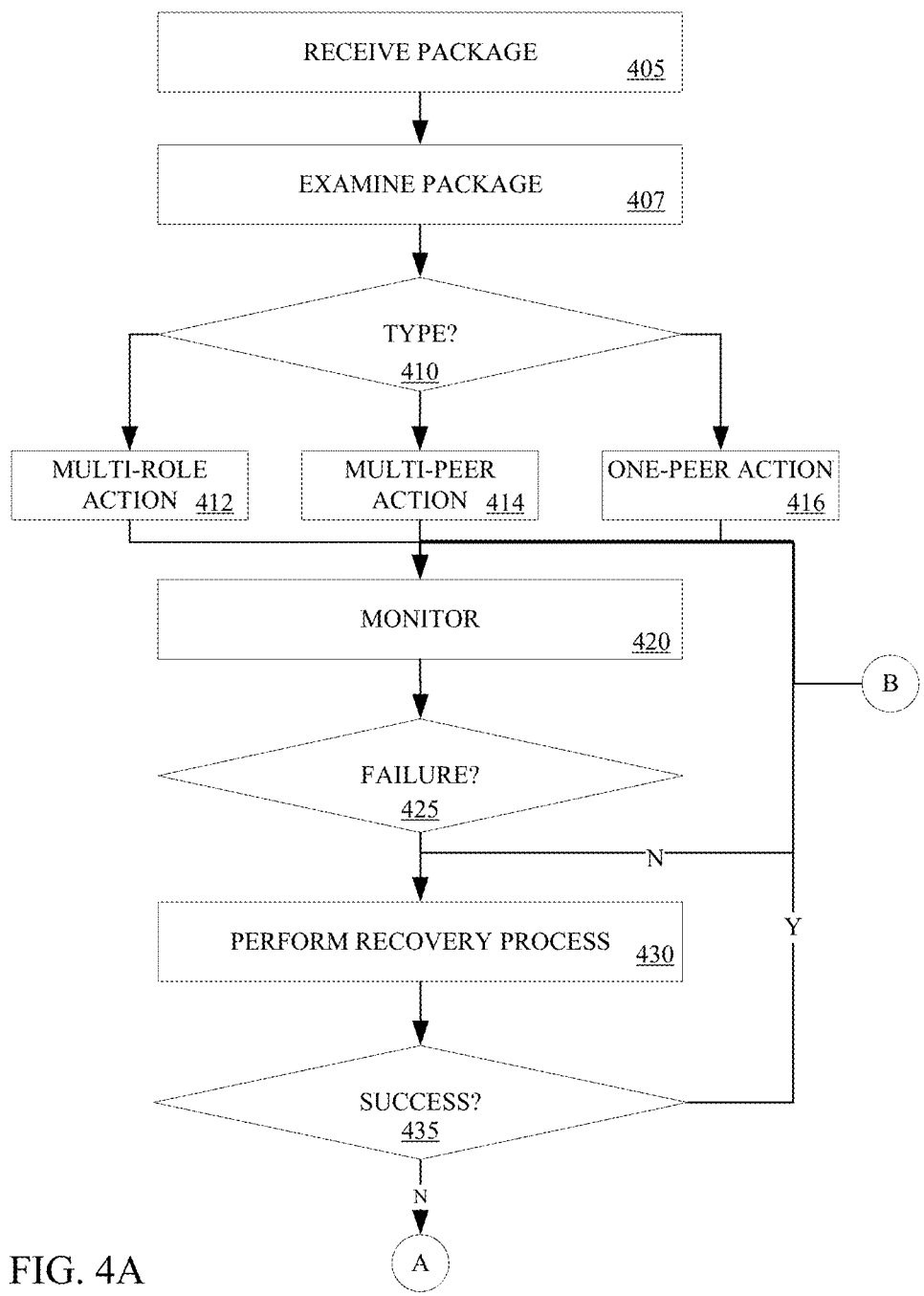
FIGS. 4A & 4B are flow diagrams illustrating one embodiment of a method performed by a peer.
Figure 4B:
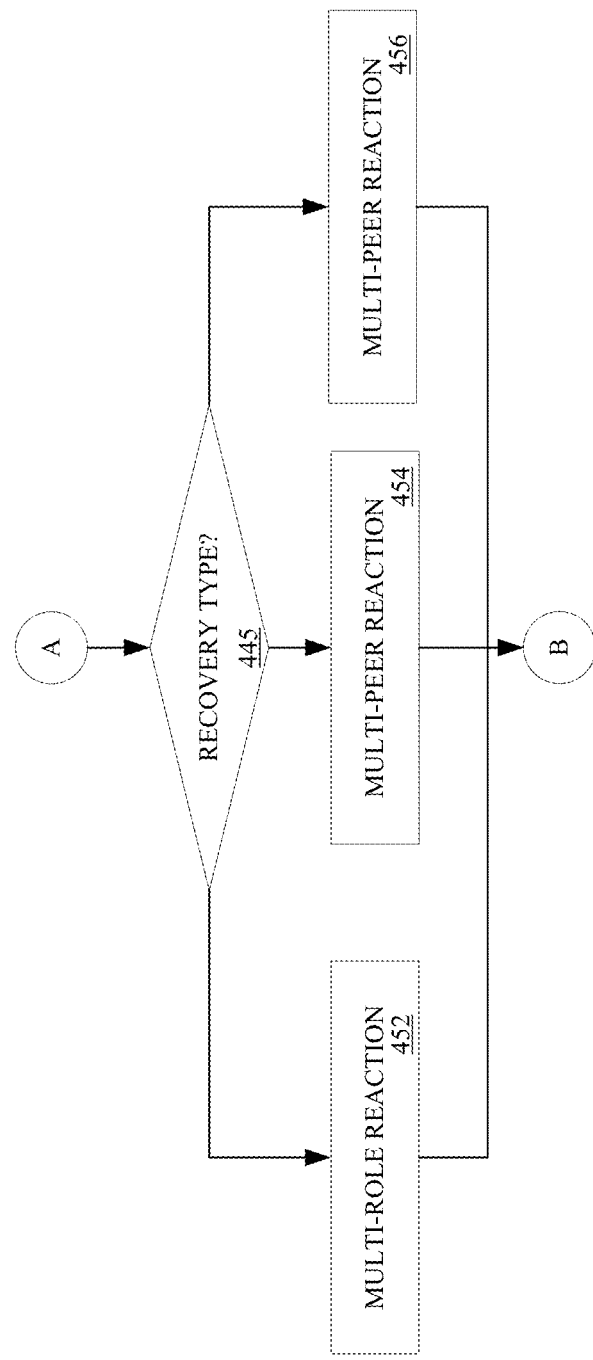

FIGS. 4A & 4B are flow diagrams illustrating one embodiment of a method for performing package management at a node (e.g., peer 250) within a fabric (e.g. fabric 120). At processing block 405 (FIG. 4A), a package is received at a node within the fabric that is to be configured within a cluster. At processing block 407, the package is examined. As discussed above, package is examined by examining the package configuration file received with the package. At decision block 410, a determination is made at the node as to the type of cluster configuration that is to be implemented at the node. As mentioned above, the configuration file indicated whether the node is to be configured as a one-peer, multi-peer and/or multi-role node within a cluster. Subsequently, the package is executed at the node based on the action (or role) that is to be performed.

For example, at processing block 412, a multi-role action is performed (e.g., start active instance on defined peers, where each peer will implement a particular served) upon a determination that package configuration file indicates a multi-role configuration. At processing block 414, a multi-peer action (e.g., start multiple instances) is performed upon a determination that package configuration file indicates a multi-peer configuration. At processing block 416, a one-peer action (e.g., start active instances) is performed upon a determination that package configuration file indicates a one-peer configuration.

Once an action is performed the package resources are monitored at the node, processing block 420. At decision block 425, a determination is made as to whether one or more resources have failed at the node. If no resource has failed, control is returned to processing block 420 where the resources continue to be monitored. Otherwise, a restart/recovery process is performed, processing block 430. At decision block 435, a determination is made as to whether the recovery process was successful. Control is returned to processing block 420, where the resources continue to be monitored, upon a determination that recovery process was successful.

Upon a determination at decision block 435 that the recovery process was unsuccessful, the type of workload package is again determined to indicate a type recovery action that is to be performed, decision block 445 (FIG. 4B). Subsequently, a recovery action is performed based on the workload package type. For example, At processing block 452, a multi-role reaction is performed upon a determination that the recovery action is a multi-role type. In one embodiment, the multi-role reaction comprises starting an available eligible peer. If only one peer is available to start all of the services on the same node, a node with the least load/services is selected.

Alternatively, at processing block 454 a multi-peer reaction is performed upon a determination that that the recovery action is a multi-peer type. Since multiple instances are executing, there will be no impact, and the failed instance is rejoined when available. Alternatively, at processing block 456, a one-peer action (e.g., start active instances) is performed upon a determination that that the recovery action is a one-peer type. As a result, the instance is placed in a standby mode. Once a reaction is performed control is returned to processing block 420, where the resources are again monitored.

Figure 5A:
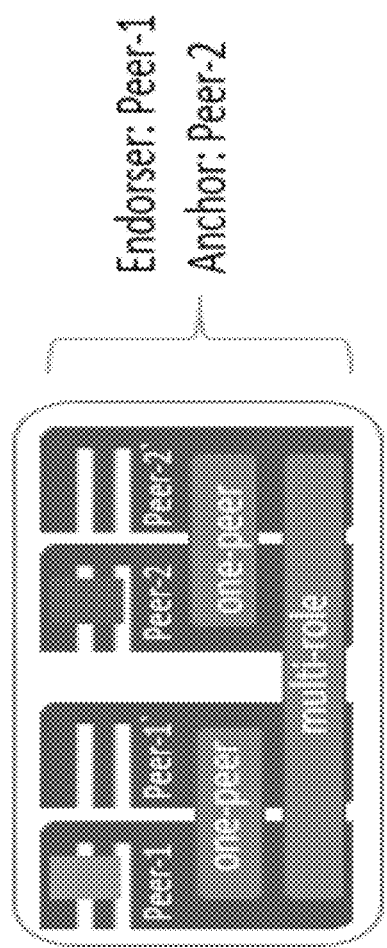
FIGS. 5A-5D illustrate one embodiment of a blockchain fabric deployment.
Figure 5B:
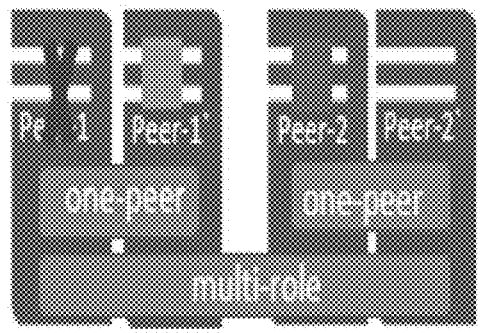
Figure 5C:
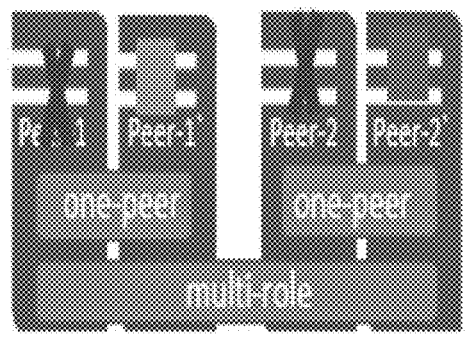
Figure 5D:
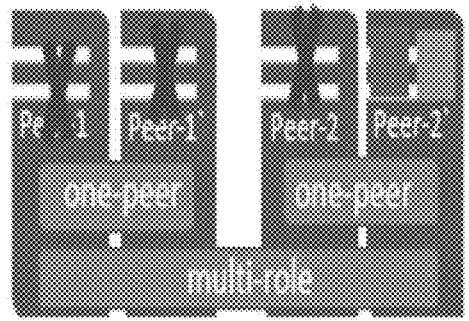

FIGS. 5A-5D illustrate one embodiment of fabric 120 implemented in a permissioned Blockchain deployment (e.g., Hyperledger Fabric). As shown in FIG. 5A, two peers are each configured in a one-peer, multi-role configuration in which peer 1 is an Endorser and peer 2 is an Anchor. Further, there is a stand-by node for each peer and each of the peers may perform multi-roles in case of simultaneous failures. FIG. 5B shows a case in which the Endorser executing on peer-1 fails and an adaptive node peer-1 takes over the role of the Endorser. FIG. 5C shows a case in which the Anchor executing on peer-2 fails and the adaptive node peer-2 takes over the role of the Anchor. FIG. 5D shows a case in which another failure occurs and the Endorser running at the adaptive peer-1 fails. In this case the Endorser role is moved to the adaptive peer-2 since these peers are configured to perform multi-roles.

Figure 6A:
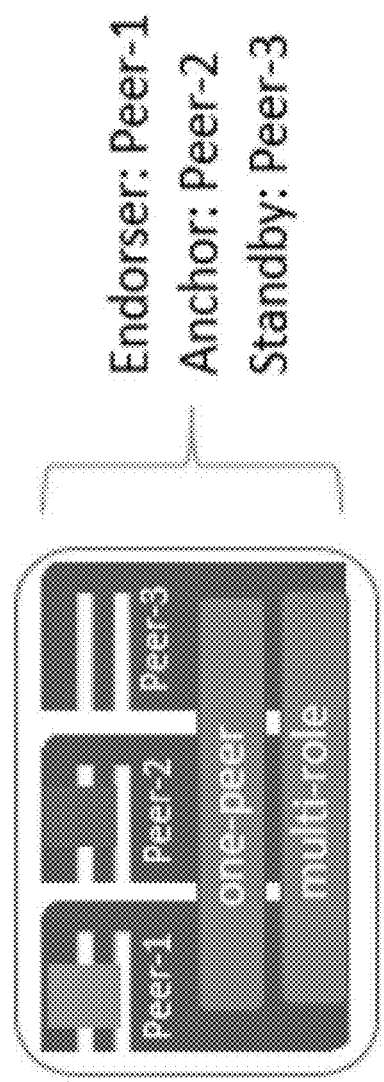
FIGS. 6A-6C illustrate another embodiment of a blockchain fabric deployment.
Figure 6B:
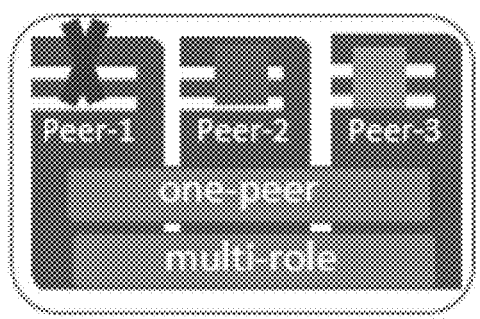
Figure 6C:
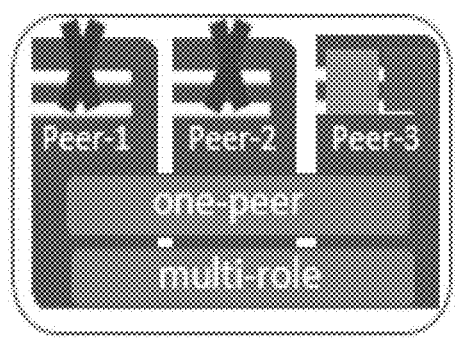

FIGS. 6A-6C illustrate another embodiment of a blockchain fabric 120 deployment. As shown in FIG. 6A, there is a single stand-by node (peer-3) included with peer-1 and peer-2 performing Endorser or Anchor roles, respectively. FIG. 6B shows a case in which the Endorser executing on peer-1 fails and an adaptive node peer-3 takes over the role of the Endorser. FIG. 6C shows a case in which the Anchor executing on peer-2 fails and the adaptive node Peer-3 takes over both the Endorser and Anchor roles since the peers can perform multi-roles.

Figure 7A:
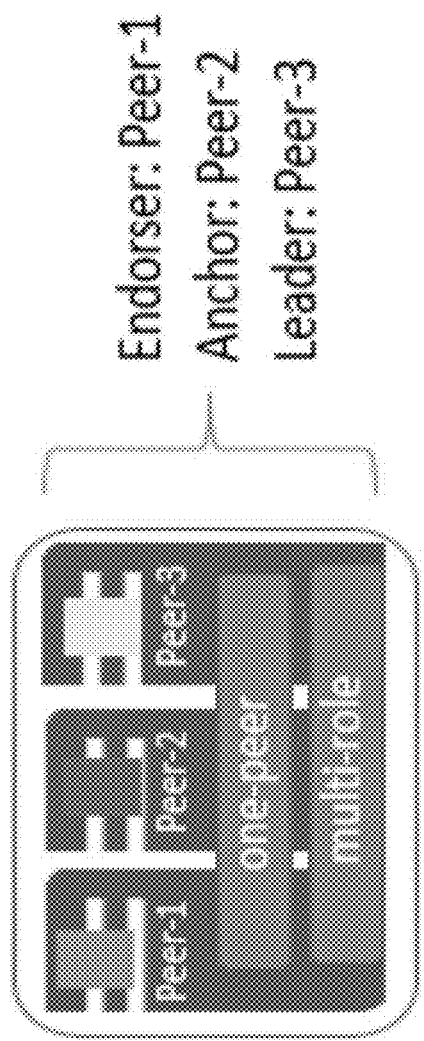
FIGS. 7A-7C illustrate yet another embodiment of a blockchain fabric deployment.
Figure 7B:
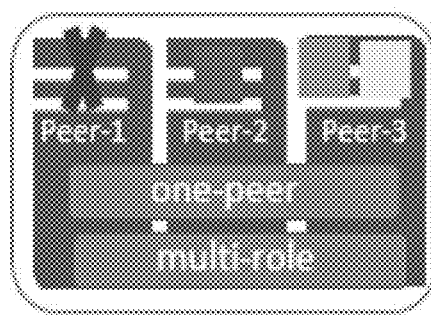
Figure 7C:
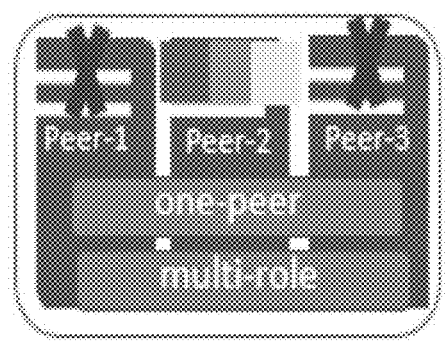

FIGS. 7A-7C illustrate yet another embodiment of a blockchain fabric 120 deployment. As shown in FIG. 7A, this deployment features peer-3 performing a Leader role. FIG. 7B shows a case in which the Endorser executing on peer-1 fails and the role of the Endorser is performed by either peer-2 or peer-3, which are currently performing Anchor and Leader roles, respectively. Based on a takeover policy, the Endorser role can be moved appropriately. In this example, Endorser role is moved to Peer-3. FIG. 7C shows a case in which peer-3 fails and the Leader and Endorser roles are moved to peer-2 to ensure a highest level of availability.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
a distributed ledger peer-to-peer blockchain fabric comprising a plurality of peer nodes, including:
a first peer node to:
receive a workload package comprising a package configuration file, wherein the package configuration file comprises a type of the workload package, a list of peer nodes including the first peer node, and one or more modules implemented to execute the workload package at resources within the peer nodes of the list, and wherein the type of the workload package designates the peer nodes of the list to operate as a cluster to execute the workload package;
examine the package configuration file at the first peer node to determine that the first peer node is to be configured to have a multi-peer role for the cluster; and
execute the workload package at resources included in the first peer node.

2. The system of claim 1, wherein the type further designates the first peer node to have a multi-role to take over a role from another peer of the list responsive to unavailability of the another peer.

3. The system of claim 1, wherein each module of the one or more modules represents a service resource that is to be performed.

4. The system of claim 3, wherein the one or more modules further comprise modules that are executed to monitor the workload package.

5. The system of claim 4, wherein the one or more modules to determine whether one or more resources at the first peer node have failed.

6. The system of claim 5, wherein the one or more modules further comprise modules to perform a recovery action responsive to upon determining that one or more resources at the first peer node have failed.

7. The system of claim 6, wherein the recovery action comprises a multi-role recovery action to move execution of the workload package from resources in the first peer node to be executed by resources in a second peer node of the list.

8. A method comprising:
receiving a workload package at a first peer node within a distributed ledger peer-to-peer blockchain fabric comprising a plurality of peer nodes, wherein the workload package comprises a package configuration file, wherein the package configuration file comprises a type of the workload package, a list of peer nodes of the plurality of peer nodes including the first peer node, and one or more modules implemented to execute the workload package at resources within the peer nodes of the list, and wherein the type of workload package designates the peer nodes of the list to operate as a cluster to execute the workload package;
examining the package configuration file at the first peer node to determine that the first peer node is to be configured to have a multi-peer role for the cluster; and
executing the workload package at resources included in the first peer node.

9. The method of claim 8, wherein the type indicates the first peer node is to have a multi-role to take over a role from another peer of the list responsive to unavailability of the another peer.

10. A non-transitory machine-readable medium storing instructions which, when executed by a processor, cause the processor to:
receive a workload package comprising a configuration file, wherein the configuration file comprises a type of the workload package, a list of peer nodes including the first peer node, and one or more modules implemented to execute the workload package at resources within the peer nodes of the list, and wherein the type of the workload package designates the peer nodes of the list to operate as a cluster to execute the workload package;
examine the configuration file at the first peer node to determine that the first peer node is to be configured to have a multi-peer role for the cluster; and execute the workload package at resources included in the first peer node.

11. The method of claim 8, wherein the type further designates the first peer node to have a multi-role to take over a role from another peer of the list responsive to unavailability of the another peer.

\* \* \* \* \*